(12) United States Patent
Pearce

(10) Patent No.: US 8,932,692 B2
(45) Date of Patent: Jan. 13, 2015

(54) CUSHIONS COMPRISING DEFORMABLE MEMBERS AND RELATED METHODS

(75) Inventor: Tony M. Pearce, Alpine, UT (US)

(73) Assignee: Edizone, LLC, Alpine, UT (US)

( * ) Notice: Subject to any disclaimer, the term of this patent is extended or adjusted under 35 U.S.C. 154(b) by 723 days.

(21) Appl. No.: 12/784,247

(22) Filed: May 20, 2010

(65) Prior Publication Data

US 2010/0227091 A1  Sep. 9, 2010

Related U.S. Application Data

(63) Continuation-in-part of application No. 12/287,047, filed on Oct. 3, 2008, now Pat. No. 8,434,748.

(60) Provisional application No. 61/216,787, filed on May 21, 2009.

(51) Int. Cl.
  *B32B 1/08* (2006.01)
  *B32B 27/08* (2006.01)
  *B29D 22/00* (2006.01)
  (Continued)

(52) U.S. Cl.
  CPC .................. *B32B 3/12* (2013.01); *A47C 27/056* (2013.01); *A47C 27/144* (2013.01); *A47C 27/148* (2013.01); *A47C 27/15* (2013.01); *A47C 27/20* (2013.01); *B32B 3/08* (2013.01)
  USPC ....... 428/36.1; 428/35.7; 428/36.2; 428/36.9; 156/242; 156/244.12; 156/244.13; 156/245; 5/716; 5/719; 5/720

(58) Field of Classification Search
  USPC .............. 428/35.7, 36.1, 36.2, 36.9; 156/242, 156/244.12, 244.13, 245; 5/716, 719, 720
  See application file for complete search history.

(56) References Cited

U.S. PATENT DOCUMENTS

| 1,228,783 A | 6/1917 | Kerivan |
| 2,029,370 A | 2/1936 | Heldenbrand |

(Continued)

FOREIGN PATENT DOCUMENTS

| EP | 0614622 A1 | 9/1994 |
| GB | 1106958 | 3/1968 |

(Continued)

OTHER PUBLICATIONS

Walker, Benjamin M., et al., Handbook of Thermoplastic Elastomers, Second Edition, 1988, pp. 26-28, Van Nostrand Reinhold Company, Inc., New York, New York.

(Continued)

*Primary Examiner* — Jeremy R Pierce
(74) *Attorney, Agent, or Firm* — TraskBritt

(57) ABSTRACT

Cushions include a plurality of pockets formed from a support material and a deformable member comprising a deformable polymer material disposed in each pocket of the plurality of pockets. The support material may comprise at least one of a fabric and a film. Each of the deformable members may be configured as a column having a column axis. Methods of forming cushions include forming a plurality of deformable members, forming a plurality of pockets from a support material, and disposing each of the deformable members of the plurality of deformable members in each of the pockets of the plurality of pockets. The deformable members may be configured so that each of the deformable members is isolated from the other deformable members by the support material.

29 Claims, 6 Drawing Sheets

(51) Int. Cl.
*B29D 23/00* (2006.01)
*B32B 37/24* (2006.01)
*B29C 47/00* (2006.01)
*A47C 23/04* (2006.01)
*B32B 3/12* (2006.01)
*A47C 27/05* (2006.01)
*A47C 27/14* (2006.01)
*A47C 27/15* (2006.01)
*A47C 27/20* (2006.01)
*B32B 3/08* (2006.01)

(56) References Cited

U.S. PATENT DOCUMENTS

| | | | |
|---|---|---|---|
| 2,385,870 A | 10/1945 | Walter et al. |
| 2,458,588 A | 1/1949 | Gordon et al. |
| 2,491,557 A | 12/1949 | Goolsbee |
| 2,617,751 A | 11/1952 | Bickett |
| 2,655,369 A | 10/1953 | Musilli |
| 2,672,183 A | 3/1954 | Forsyth |
| 2,715,435 A | 8/1955 | Rymland |
| 2,814,053 A | 11/1957 | Sevik |
| 2,887,425 A | 5/1959 | Holland |
| 2,979,739 A | 4/1961 | Krakauer |
| 3,043,731 A | 7/1962 | Hill |
| 3,197,357 A | 7/1965 | Schulpen |
| 3,222,697 A | 12/1965 | Scheermesser |
| 3,308,491 A | 3/1967 | Spence |
| 3,407,406 A | 10/1968 | Werner et al. |
| 3,459,179 A | 8/1969 | Olesen |
| 3,462,778 A | 8/1969 | Whitney |
| 3,518,786 A | 7/1970 | Holtvoigt |
| 3,529,368 A | 9/1970 | Canfield |
| 3,552,044 A | 1/1971 | Wiele |
| 3,605,145 A | 9/1971 | Graebe |
| 3,748,669 A | 7/1973 | Warner |
| 3,748,779 A | 7/1973 | Cherk et al. |
| 3,801,420 A | 4/1974 | Anderson |
| 3,893,198 A | 7/1975 | Blair |
| 3,940,811 A | 3/1976 | Tomikawa et al. |
| 3,968,530 A | 7/1976 | Dyson |
| 3,986,213 A | 10/1976 | Lynch |
| 4,038,762 A | 8/1977 | Swan, Jr. |
| 4,083,127 A | 4/1978 | Hanson |
| 4,144,658 A | 3/1979 | Swan, Jr. |
| 4,163,297 A | 8/1979 | Neumark |
| 4,229,546 A | 10/1980 | Swan, Jr. |
| 4,243,754 A | 1/1981 | Swan, Jr. |
| 4,247,963 A | 2/1981 | Reddi |
| 4,252,910 A | 2/1981 | Schaefer |
| 4,255,202 A | 3/1981 | Swan, Jr. |
| 4,256,304 A | 3/1981 | Smith et al. |
| 4,274,169 A | 6/1981 | Standiford |
| 4,279,044 A | 7/1981 | Douglas |
| 4,292,701 A | 10/1981 | Woychick |
| 4,335,476 A | 6/1982 | Watkin |
| 4,369,284 A | 1/1983 | Chen |
| 4,370,769 A | 2/1983 | Herzig et al. |
| 4,378,396 A | 3/1983 | Urai et al. |
| 4,383,342 A | 5/1983 | Forster |
| 4,422,194 A | 12/1983 | Viesturs et al. |
| 4,457,032 A | 7/1984 | Clarke |
| 4,467,053 A | 8/1984 | Markle |
| 4,472,847 A | 9/1984 | Gammons et al. |
| 4,483,029 A | 11/1984 | Paul |
| 4,485,505 A | 12/1984 | Paul |
| 4,485,568 A | 12/1984 | Landi et al. |
| 4,498,205 A | 2/1985 | Hino |
| 4,541,136 A | 9/1985 | Graebe |
| 4,572,174 A | 2/1986 | Eilender et al. |
| 4,588,229 A | 5/1986 | Jay |
| 4,614,632 A | 9/1986 | Kezuka et al. |
| 4,618,213 A | 10/1986 | Chen |
| 4,628,557 A | 12/1986 | Murphy |
| 4,660,238 A | 4/1987 | Jay |
| 4,670,925 A | 6/1987 | Carussi et al. |
| 4,686,724 A | 8/1987 | Bedford |
| 4,698,864 A | 10/1987 | Graebe |
| 4,709,431 A | 12/1987 | Shaktman |
| 4,713,854 A | 12/1987 | Graebe |
| 4,726,624 A | 2/1988 | Jay |
| 4,728,551 A | 3/1988 | Jay |
| 4,737,998 A | 4/1988 | Johnson, Sr. |
| 4,744,564 A | 5/1988 | Yamada |
| 4,761,843 A | 8/1988 | Jay |
| 4,842,330 A | 6/1989 | Jay |
| 4,913,755 A | 4/1990 | Grim |
| 4,945,588 A | 8/1990 | Cassidy et al. |
| 4,952,190 A | 8/1990 | Tarnoff et al. |
| 4,952,439 A | 8/1990 | Hanson |
| 4,953,913 A | 9/1990 | Graebe |
| 4,959,059 A | 9/1990 | Eilender et al. |
| 4,967,433 A | 11/1990 | Neal |
| 5,010,608 A | 4/1991 | Barnett et al. |
| 5,013,518 A | 5/1991 | Nielinger et al. |
| 5,015,313 A | 5/1991 | Drew et al. |
| 5,018,790 A | 5/1991 | Jay |
| 5,020,176 A | 6/1991 | Dotson |
| 5,027,801 A | 7/1991 | Grim |
| 5,039,567 A | 8/1991 | Landi et al. |
| 5,052,068 A | 10/1991 | Graebe |
| 5,053,436 A | 10/1991 | Delgado |
| 5,058,291 A | 10/1991 | Hanson |
| 5,074,620 A | 12/1991 | Jay et al. |
| 5,079,786 A | 1/1992 | Rojas |
| 5,079,787 A | 1/1992 | Pollmann |
| 5,093,138 A | 3/1992 | Drew et al. |
| 5,100,712 A | 3/1992 | Drew et al. |
| 5,103,518 A | 4/1992 | Gilroy et al. |
| 5,111,544 A | 5/1992 | Graebe |
| 5,147,685 A | 9/1992 | Hanson |
| 5,149,173 A | 9/1992 | Jay et al. |
| 5,152,023 A | 10/1992 | Graebe |
| 5,153,956 A | 10/1992 | Nold |
| 5,163,196 A | 11/1992 | Graebe et al. |
| 5,171,766 A | 12/1992 | Mariano et al. |
| 5,172,494 A | 12/1992 | Davidson |
| 5,180,619 A | 1/1993 | Landi et al. |
| 5,190,504 A | 3/1993 | Scatterday |
| 5,191,752 A | 3/1993 | Murphy |
| 5,201,780 A | 4/1993 | Dinsmoor, III et al. |
| 5,203,607 A | 4/1993 | Landi |
| 5,204,154 A | 4/1993 | Drew et al. |
| 5,211,446 A | 5/1993 | Jay et al. |
| 5,243,722 A | 9/1993 | Gusakov |
| 5,255,404 A | 10/1993 | Dinsmoor, III et al. |
| 5,262,468 A | 11/1993 | Chen |
| 5,282,286 A | 2/1994 | MacLeish |
| 5,289,878 A | 3/1994 | Landi et al. |
| 5,314,735 A | 5/1994 | Kronberg |
| 5,330,249 A | 7/1994 | Weber et al. |
| 5,334,646 A | 8/1994 | Chen |
| 5,334,696 A | 8/1994 | Olson et al. |
| 5,335,907 A | 8/1994 | Spector |
| 5,336,708 A | 8/1994 | Chen |
| 5,352,023 A | 10/1994 | Jay et al. |
| 5,360,653 A | 11/1994 | Ackley |
| 5,362,834 A | 11/1994 | Schapel et al. |
| 5,369,828 A | 12/1994 | Graebe |
| 5,403,642 A | 4/1995 | Landi et al. |
| 5,421,874 A | 6/1995 | Pearce |
| 5,429,852 A | 7/1995 | Quinn |
| 5,444,881 A | 8/1995 | Landi et al. |
| 5,445,861 A | 8/1995 | Newton et al. |
| 5,452,488 A | 9/1995 | Reinhardt |
| 5,456,072 A | 10/1995 | Stern |
| 5,490,299 A | 2/1996 | Dinsmoor, III et al. |
| 5,496,610 A | 3/1996 | Landi et al. |
| 5,508,334 A | 4/1996 | Chen |
| 5,513,402 A | 5/1996 | Schwartz |
| 5,549,743 A | 8/1996 | Pearce |
| 5,592,706 A | 1/1997 | Pearce |
| 5,617,595 A | 4/1997 | Landi et al. |

(56) References Cited

U.S. PATENT DOCUMENTS

| | | | |
|---|---|---|---|
| 5,626,657 A | 5/1997 | Pearce | |
| 5,633,286 A | 5/1997 | Chen | |
| 5,636,395 A | 6/1997 | Serda | |
| 5,689,845 A | 11/1997 | Sobieralski et al. | |
| 5,749,111 A | 5/1998 | Pearce | |
| 5,881,409 A | 3/1999 | Pearce | |
| 5,994,450 A | 11/1999 | Pearce | |
| 6,026,527 A | 2/2000 | Pearce | |
| 6,115,861 A | 9/2000 | Reeder et al. | |
| 6,187,837 B1 | 2/2001 | Pearce | |
| 6,241,695 B1 | 6/2001 | Dabir | |
| 6,290,794 B1 | 9/2001 | Yates | |
| 6,413,458 B1 | 7/2002 | Pearce | |
| 6,490,744 B1 * | 12/2002 | Schulz, Jr. ............ | 5/720 |
| 6,498,198 B2 | 12/2002 | Pearce | |
| 6,598,321 B2 | 7/2003 | Crane et al. | |
| 6,704,961 B2 | 3/2004 | Kienlein | |
| 6,797,765 B2 | 9/2004 | Pearce | |
| 6,865,759 B2 | 3/2005 | Pearce | |
| 6,905,431 B2 | 6/2005 | Pearce et al. | |
| 6,905,831 B2 | 6/2005 | Jiang et al. | |
| 6,908,662 B2 | 6/2005 | Pearce | |
| 7,060,213 B2 | 6/2006 | Pearce | |
| 7,076,822 B2 | 7/2006 | Pearce | |
| 7,138,079 B2 | 11/2006 | Pearce | |
| 7,444,703 B2 | 11/2008 | Jansen | |
| 7,666,341 B2 | 2/2010 | Pearce | |
| 7,730,566 B2 | 6/2010 | Flick et al. | |
| 8,075,981 B2 | 12/2011 | Pearce et al. | |
| 8,424,137 B1 | 4/2013 | Pearce et al. | |
| 8,434,748 B1 | 5/2013 | Pearce et al. | |
| 2002/0013407 A1 * | 1/2002 | Pearce ............ | 525/32.1 |
| 2002/0061384 A1 * | 5/2002 | Yates ............ | 428/76 |
| 2004/0172766 A1 | 9/2004 | Formenti | |
| 2005/0223667 A1 | 10/2005 | McCann et al. | |
| 2006/0194925 A1 | 8/2006 | Pearce | |
| 2007/0246157 A1 | 10/2007 | Mason et al. | |
| 2009/0246449 A1 | 10/2009 | Jusiak | |
| 2010/0229308 A1 | 9/2010 | Pearce et al. | |

FOREIGN PATENT DOCUMENTS

| | | |
|---|---|---|
| GB | 1261475 | 1/1972 |
| GB | 2150431 A | 7/1985 |
| KR | 20-0315625 | 6/2003 |
| KR | 20-0380271 | 3/2005 |
| KR | 10-2007-0026934 | 3/2007 |
| WO | 88/10339 A1 | 12/1988 |
| WO | 91/04290 A1 | 4/1991 |
| WO | 92/14387 A1 | 9/1992 |
| WO | 96/39065 A1 | 12/1996 |
| WO | 97/17001 A1 | 5/1997 |

OTHER PUBLICATIONS

U.S. Appl. No. 61/039,259, filed Mar. 25, 2008, 26 pages.
International Search Report and Written Opinion for International Application No. PCT/US2010/035587, Publication No. WO 2010/135542, mailed Jan. 3, 2011 (7 pages).
International Search Report and Written Opinion for International Application No. PCT/US2010/035602, Publication No. WO 2010/135550, mailed Dec. 22, 2010 (8 pages).
International Search Report and Written Opinion for International Application No. PCT/US2010/035635, Publication No. WO 2010/135565, mailed Dec. 27, 2010.
U.S. Appl. No. 12/287,056, filed Oct. 3, 2008, 13 pages.

* cited by examiner

CUSHIONS COMPRISING DEFORMABLE MEMBERS AND RELATED METHODS

CROSS-REFERENCE TO RELATED APPLICATIONS

This application claims the benefit of U.S. Provisional Patent Application Ser. No. 61/216,787, which was filed on May 21, 2009 and entitled "Cushions with Individually Pocketed Non-Linear Members, Gel Springs with Joiner Ribs, Gel Cores," which is incorporated herein in its entirety by this reference. This application is a continuation-in-part of U.S. patent application Ser. No. 12/287,047, filed Oct. 3, 2008, now U.S. Pat. No. 8,434,748, issued May 9, 2013, and entitled "Gel Springs," which is also incorporated herein in its entirety by this reference.

TECHNICAL FIELD

Embodiments of the present invention relate to cushions used to cushion at least a portion of a body of a person, and to methods of making and using such cushions.

BACKGROUND

Cushions for cushioning at least a portion of a body of a person are fabricated in a wide variety of configurations and using a wide variety of materials. For example, polymeric foams are often used to form cushions. Cushions have also been fabricated using what are referred to in the art as "gelatinous elastomeric materials," "gel elastomers," "gel materials," or simply "gels." These terms are used synonymously herein, and mean a plasticized elastomeric polymer composition comprising at least 15% plasticizer by weight, having a hardness that is softer than about 50 on the Shore A scale of durometer, and a tensile elongation at failure of at least about 500%. Such gels, methods for making such gels, and applications in which such gels may be used are disclosed in, for example, U.S. Pat. No. 5,749,111, which issued May 12, 1998 to Pearce, U.S. Pat. No. 5,994,450, which issued Nov. 30, 1999 to Pearce, and in U.S. Pat. No. 6,026,527, which issued Feb. 22, 2000 to Pearce, each of which patents is incorporated herein in its entirety by this reference.

BRIEF SUMMARY

In some embodiments, the present invention includes cushions that comprise a support material having a plurality of connected pockets formed therein, the support material comprising at least one of a fabric and a film, and a plurality of deformable members. At least one deformable member of the plurality of deformable members is disposed within at least one of the connected pockets of the plurality of connected pockets. The plurality of deformable members comprise a deformable polymer material.

In additional embodiments, the present invention includes cushions that comprise a plurality of deformable members, each deformable member of the plurality of deformable members comprising a gel material, and each deformable member of the plurality of deformable members is configured as a column having a column axis. A support material at least partially surrounds each deformable member of the plurality of deformable members. The support material has a plurality of pockets formed therefrom, where each deformable member of the plurality of deformable members is disposed respectively within a pocket of the plurality of pockets. Each deformable member of the plurality of deformable members is configured to buckle within the pocket of the plurality of pockets when compressed along the column axis of the deformable member to a pressure beyond a threshold pressure level.

In further embodiments, the present invention includes methods of forming cushions that comprise forming a plurality of deformable members, each of the deformable members of the plurality of deformable members comprising a deformable polymer material and configured as a column having a column axis, forming a plurality of interconnected pockets from a support material comprising at least one of a fabric material and a film, and disposing each of the deformable members of the plurality of deformable members in each interconnected pocket of the plurality of interconnected pockets.

DETAILED DESCRIPTION

The illustrations presented herein are not actual views of any particular cushion, or feature thereof, but are merely idealized representations, which are employed to describe embodiments of the invention.

Figure 1:
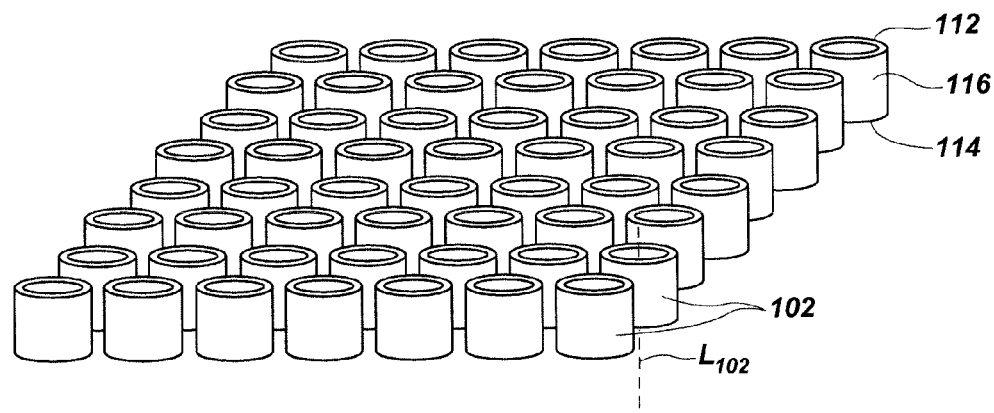
FIGS. 1 through 4 illustrate an embodiment of a cushion of the present invention that includes hollow, cylindrical deformable members disposed within pockets formed from a supporting material.
Figure 2:
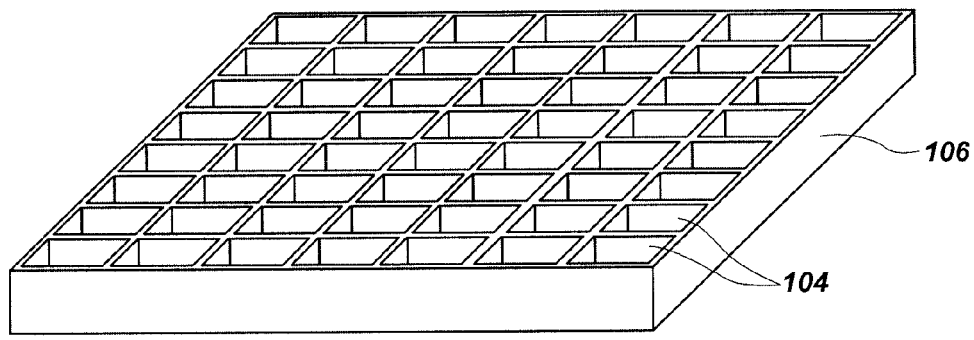
Figure 3:
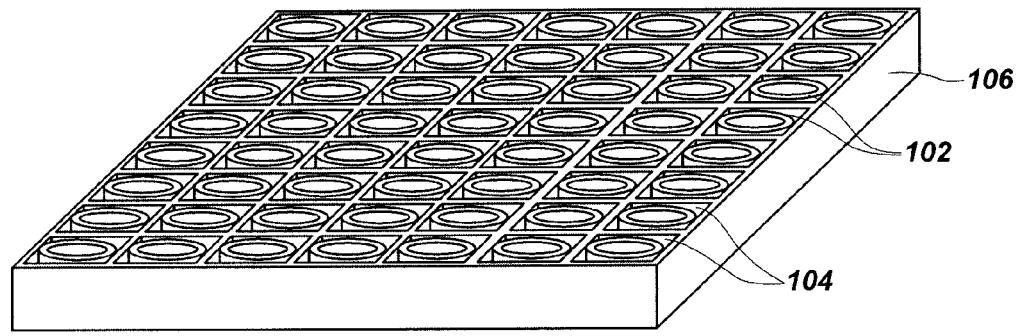
Figure 4:
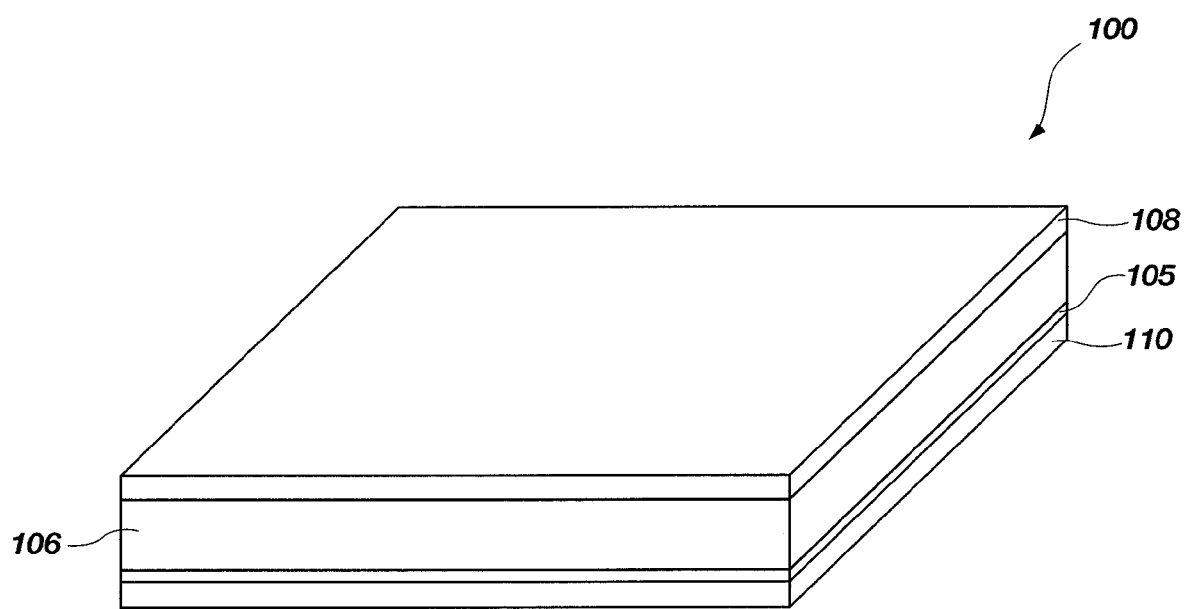

FIGS. 1 through 4 illustrate an embodiment of a cushion 100 (FIG. 4) of the present invention. The complete cushion 100 is shown in FIG. 4. The cushion 100 includes a plurality of deformable members 102, which are shown isolated from other features of the cushion 100 in FIG. 1. As shown in FIG. 2, a plurality of pockets 104 is formed in a support material 106, such as a fabric material. As used herein, the term "pockets" is used to refer to an opening laterally surrounded by a support material 106. The deformable members 102 are disposed within the plurality of pockets 104 as shown in FIG. 3. As shown in FIG. 4, the cushion 100 may further comprise at least one of a top layer 108 and a bottom layer 110 disposed over the top ends 112 and the bottom ends 114 (FIG. 1) of the deformable members 102.

As discussed in further detail below, each of the deformable members 102 may comprise an individual hollow or solid structure that is laterally isolated from the other deformable members 102 via the plurality of pockets 104. Each of the deformable members 102 may be configured to buckle upon compression of the deformable member 102 beyond a threshold-buckling load. Furthermore, each of the deformable members 102 may comprise a gel, as discussed in further detail below.

As shown in FIG. 1, each deformable member 102 may comprise a column having a longitudinal or column axis $L_{102}$. The column axis $L_{102}$ may be oriented generally perpendicular to the major surfaces of the cushion that are configured to support at least a portion of a body of a person. In some embodiments, each deformable member 102 may have a shape that is symmetric about at least one plane containing the column axis $L_{102}$. In some embodiments, each deformable member 102 may have a shape that is symmetric about all planes containing the column axis $L_{102}$. For example, each deformable member 102 may be generally cylindrical, as shown in FIG. 1. Additionally, each deformable member 102 may be hollow, and generally cylindrical (i.e., generally tubular), as shown in FIG. 1. In additional embodiments, each deformable member 102 may have a shape that is asymmetric about one or more planes containing the column axis $L_{102}$. In some embodiments, each of the deformable members 102 may have a length (measured along the column axis $L_{102}$) that is longer than the average outer diameter of the deformable member 102. In other embodiments, each of the deformable members 102 may have a length that is shorter than the average outer diameter of the deformable member 102. In yet further embodiments, each of the deformable members 102 may have a length that is at least substantially equal to the average outer diameter of the deformable member 102.

The deformable members 102 may have any hollow or solid cross-sectional shape at any plane orthogonal to the intended principle cushioning direction, such as circular, square, rectangular, triangular, star-shaped, hexagonal, octagonal, pentagonal, oval, I-Beam, H-Beam, E-Beam, or irregularly shaped. The deformable members 102 can be of any shape, and do not need to have a uniform cross-sectional shape along the length of the deformable members 102. For example, the top ends 112 of the deformable members 102 may have a square cross-sectional shape, the bottom ends 114 of the deformable members 102 may have an oval cross-sectional shape, and the cross-sectional shape of the deformable members 102 may transition from the square shape to the oval shape along the length of the deformable members 102. In some embodiments, the deformable members 102 may have varying average diameters along the lengths of the deformable members 102. In embodiments in which the deformable members 102 are hollow, the wall thicknesses of the deformable members 102 may vary along the lengths of the deformable members 102. Furthermore, in some embodiments, the deformable members 102 may have a material composition that varies along the lengths of the deformable members 102. The deformable members 102 may also include additional features, such as flanges and molded in images, such as logos including letters or numbers.

In the same cushion 100, one or more deformable members 102 may be different from one or more other deformable members 102 of the cushion 100 in shape, size, material composition, etc. The spacing between deformable members 102 in a cushion 100 may be uniform, or it may vary within the cushion 100. The outer lateral side surfaces of the deformable members 102 may be vertically oriented, or they may be oriented at an acute angle other than zero degrees)(0°) to vertical, and the angle may vary (continuously or in a stepwise manner) along the length of the deformable members 102.

The deformable members 102 are shown as having uniform lengths or heights (i.e., the dimension extending along the column axis $L_{102}$ of the deformable members 102), but they can have varying heights in additional embodiments. Such configurations may be desirable in cushions where a top cushioning surface having a contour may be desirable, such as, for example, in wheelchair cushions.

As non-limiting examples, each deformable member 102 may comprise a wall 116 having an average thickness of between about one-tenth of a centimeter (0.1 cm) and about twenty-five centimeters (25 cm). Furthermore, each deformable member 102 may have an average outer diameter of between about one-half of a centimeter (0.5 cm) and about twelve centimeters (12 cm). The deformable members 102 may have a length (i.e., a height) of between about one-half of a centimeter (0.5 cm) and about thirty centimeters (30 cm). The shortest distance between outer walls 116 of adjacent deformable members 102 may be between about twice the thickness of the support material. For example, the shortest distance between outer walls 116 of adjacent deformable members 102 may be between about one twentieth of a centimeter (0.05 cm) and about fifteen centimeters (15 cm). In one embodiment, the deformable member 102 having a hollow cylindrical shape may be about thirteen centimeters (13 cm) in length, an average outer diameter of about six centimeters (6 cm) and a substantially constant wall thickness of about one-half of a centimeter (0.5 cm).

Individual deformable members 102 may be configured to buckle when compressed in the intended cushioning direction (e.g., in a direction at least substantially parallel to the column axis $L_{102}$ of the deformable members 102) beyond a threshold load. Furthermore, individual deformable members 102 may be configured to deform when sheared in a direction transverse to the intended principle cushioning direction (e.g., in a direction generally perpendicular to the column axis $L_{102}$) to allow relative transverse movement between the top ends 112 and the bottom ends 114 of the deformable members 102. Buckling of a hollow deformable member 102 may occur in multiple ways. For example, unstable bending of the wall 116 of the deformable member 102 in one or more places inward or outward, or overall bending of the entire deformable member 102. Furthermore the deformable member 102 may twist which forces part of the deformable member 102 inward allowing an upper portion of the deformable member 102 to descend. When the load from the cushioned object or person is removed, the deformable members 102 substantially return to their original unloaded shape.

Referring to FIG. 3, each of the deformable members 102 may be disposed within the pockets 104 in the support material 106. The pockets 104 may be formed such that the support material 106 of the pocket 104 laterally surrounds (i.e., in directions perpendicular to the column axis $L_{102}$ of the deformable members 102) at least one of the deformable members 102. In other words, the support material 106 may extend in the space or spaces between adjacent deformable members 102 along at least a portion of the length of the deformable member 102. In some embodiments, the pockets 104 may be sized to fit at least one deformable member 102. In additional embodiments, more than one deformable member 102 may be placed in each of the pockets 104. In some embodiments, the pockets 104 may be configured to snugly or securely hold the deformable member 102. In additional embodiments, the pockets 104 may be sized larger than the deformable member 102 so that the deformable member 102 loosely fits within the pocket 104. The pockets 104 may be laterally spaced from one another such that the buckling of one deformable member 102 does not cause displacement or buckling of any other deformable members 102. In additional embodiments, the pockets 104 may be laterally spaced from one another such that the buckling of one deformable member 102 causes displacement or buckling of immediately adjacent deformable members 102, but does not cause displacement or deformation of deformable members 102 not immediately adjacent the buckled deformable member 102.

In some embodiments, the deformable members 102 may comprise a gel. The deformable members 102 may be formed entirely from a gel, or they may have a composition comprising a gel and one or more additional non-gel materials. Such gels and gel compositions are described in, for example, U.S. Pat. No. 5,749,111 entitled Gelatinous Cushions with Buckling Columns and issued on May 12, 1998, U.S. Pat. No. 6,026,527 entitled Gelatinous Cushions with Buckling Columns issued Feb. 22, 2000, and U.S. Pat. No. 5,994,450 entitled Gelatinous Elastomer and Methods and Making and Using the Same and Articles Made Therefrom issued on Jan. 10, 1997, each of which patent is incorporated in its entirety herein by this reference. In one embodiment, the gel may include an elastomeric gel comprising between about 15 to about 500 parts plasticizer per 100 parts solid elastomer by weight. For example, in one embodiment, the gel may comprise KRATON® E1830 elastomer and a white food grade mineral oil, such as CARNATION® oil. In another embodiment, the gel may comprise SEPTON® 4055 elastomer and a white food grade mineral oil. In additional embodiments, the gel may comprise a polyurethane-based gel, a silicone-based gel, and a PVC-based gel. The deformable members 102 may be bare, un-coated deformable members 102, or they may be coated or covered with or adhered to or fused with another material.

The support material 106 forming the pockets 104 may comprise a fabric or film. The support material 106 may comprise any fabric or film material appropriate for cushioning applications, including woven materials and non-woven materials. In one embodiment the fabric material 106 may comprise a non-woven polypropylene fabric. In some embodiments, the support material 106 and pockets 104 may be at least substantially similar to the support material and pockets surrounding traditional coil springs in a pocketed coil innerspring unit available from Texas Pocket Springs Technology, Inc. (Cleburne, Tex.). In additional embodiments, the fabric material 106 may comprise a stretchable or elastic material or any material that can flex, bend, compress, shear, stretch, and/or move with the deformable members 102 while they are under compressive loading while cushioning. For example, the support material 106 may comprise circular knit fabrics or pliable, stretchable films, such as a polyurethane film or a flexible polyvinyl chloride (PVC) film. The support material 106 may have a composition and configuration selected to allow the deformable members 102 to buckle or otherwise compress stably or unstably, in a linearly elastic fashion or a non-linearly elastic fashion, and to at least substantially return to its original shape along with the deformable members 102 when released from the compressive load. The support material 106 comprising an elastic material may provide less resistance to compression of the deformable members 104 than a non-elastic material, thereby, in some embodiments, improving the cushioning effects of the cushion 100.

Figure 7:
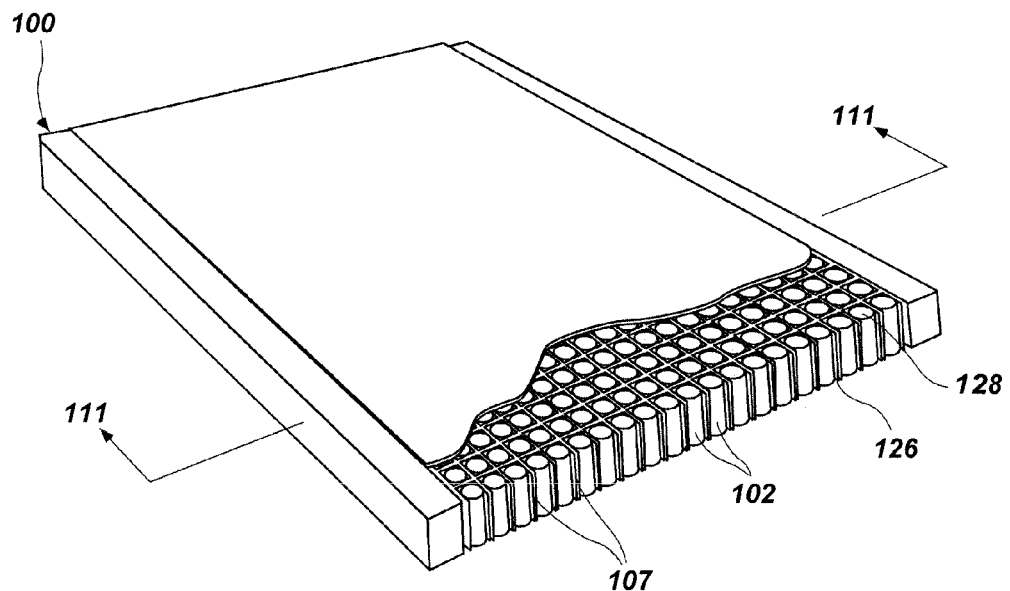
FIG. 7 illustrates another embodiment of a cushion of the present invention that includes hollow, cylindrical deformable members disposed within pockets formed from a supporting material.
Figure 8:
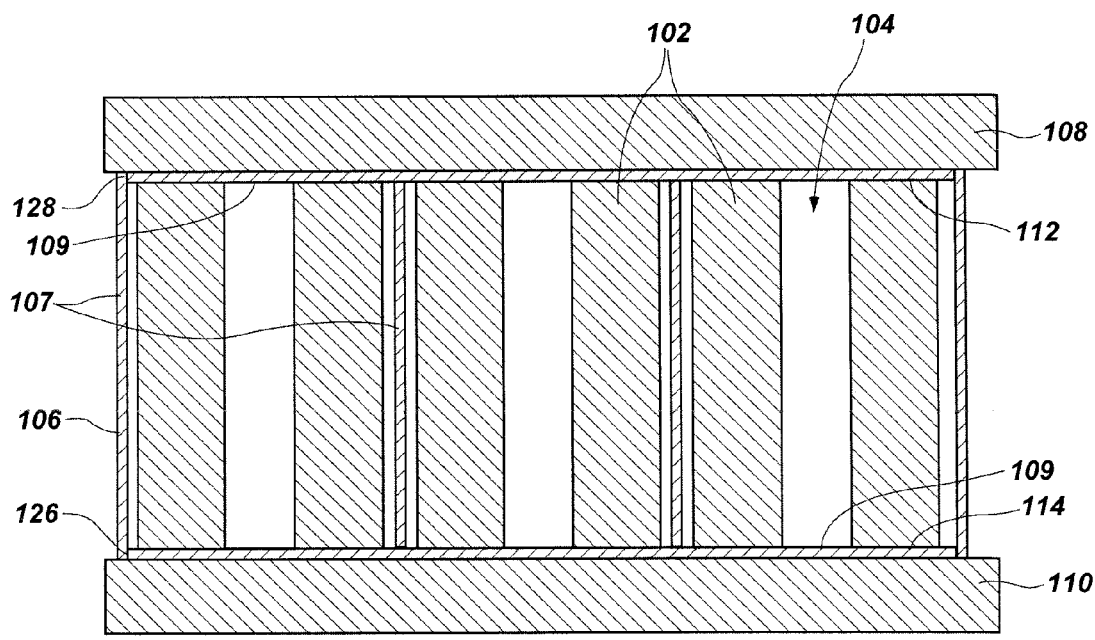
FIG. 8 illustrates one embodiment of a partial cross-sectional view of the cushion of FIG. 7.
Figure 9:
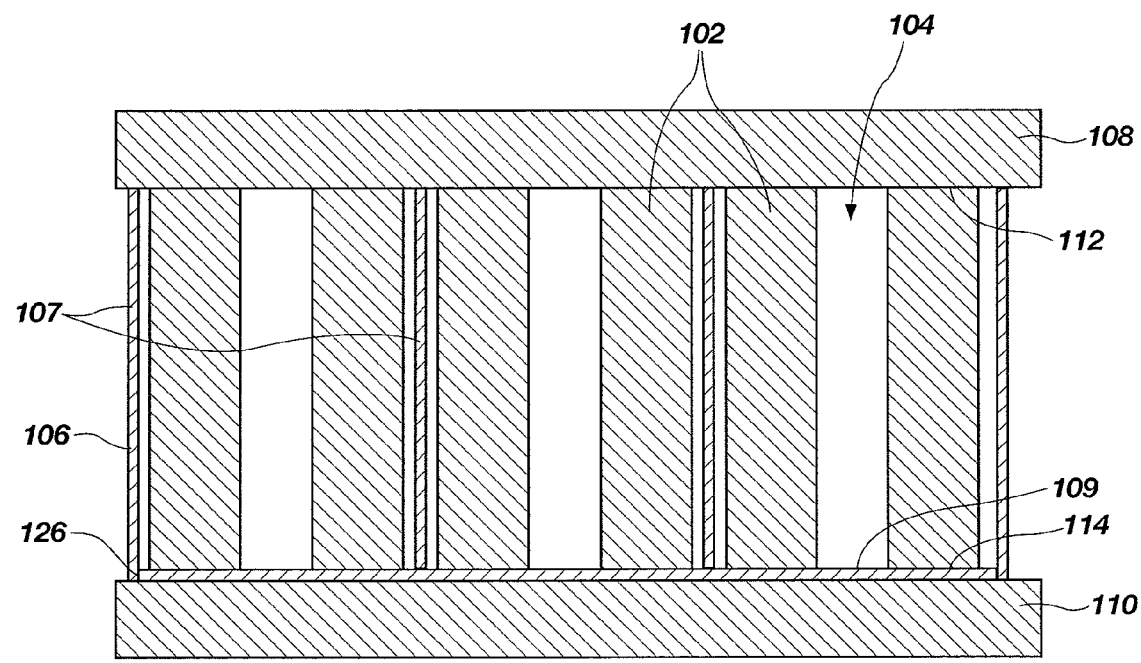
FIG. 9 illustrates another embodiment of a partial cross-sectional view of the cushion of FIG. 7.

In some embodiments, the plurality of pockets 104 may be formed from discrete, hollow, flexible fabric or film containers 107 comprising the support material as shown in FIGS. 7 through 9. FIG. 8 illustrates an embodiment of the cushion 100 of FIG. 4 including a plurality of discrete, hollow, flexible fabric or film containers 107. The flexible fabric or film containers 107 may comprise a top layer 108 and a bottom layer 110 extending over each of the flexible fabric or film containers 107 enclosing the deformable members 102 therein.

FIG. 8 illustrates a partial cross-sectional view of the cushion 100 of FIG. 7 taken along section line 111. As shown in FIG. 8, each deformable member 102 may be disposed within the flexible fabric or film container 107. For example, a plurality of generally cylindrical tubes of fabric or film container 107 may be formed, and a single deformable member 102 may be contained within each fabric or film container 107. Each fabric or film container 107 may be substantially isolated from the other fabric or film containers 107, although they may be connected to one another at one or both longitudinal ends of the fabric or film containers. The fabric or film containers 107 may extend beyond at least one of the top ends 112 and the bottom ends 114 of the deformable members 102, the fabric or film containers 107 may be flush with the top ends 112 and the bottom ends 114 of the deformable members 102, or at least one of the top ends 112 and the bottom ends 114 of the deformable members 102 may extend beyond the fabric or film containers 107.

The fabric or film containers 107 may include at least one closed end 109 at one or both longitudinal ends thereof. In one embodiment, for example, the fabric or film containers 107 may have a closed end 109 at a bottom end 126 and at a top end 128 as shown in FIG. 8. In one embodiment, closed end 109 may be formed by closing the support material 106 itself. For example, the support material 106 may be closed by gluing, sewing, or thermally welding one side of the support material 106 of the fabric or film container 107 to the opposite side of the support material 106 of the fabric or film container at the bottom end 126 and the top end 128. If both the bottom end 126 and the top end 128 are closed, the deformable member 102 must be disposed into the fabric or film container 107 prior to closing both the bottom end 126 and the top end 128. In some embodiments, the deformable members 102 may be partially deformed in the closed fabric or film container 107 but not deformed enough to cause buckling of the deformable members 102. The bottom layer 110 may then be connected to the closed end 109 of the support material 106 at the bottom end 126 and the top layer 108 may be connected to the closed end 109 of the support material 106 at the top end 128. In an alternative embodiment, as shown in FIG. 9 at least one of the top end 128 and the bottom end 126 of the fabric or film container 107 may remain open, such as the top end 128 as shown in FIG. 9. When the fabric or film container 107 is open, the bottom layer 110 and/or top layer 108 may be used to close the bottom end 126 and/or the top end 128 of the fabric or film container 107. For example, as shown in FIG. 9, the top layer 108 closes the top end 128 of the fabric or film container 107.

As shown in FIG. 8, each of the deformable members 102 may be physically isolated from another deformable member 102 by the fabric or film containers 107. Physically isolating the deformable members 102 in the fabric or film containers 107 may allow each deformable member 102 to buckle, when a pressure is applied thereto, without causing displacement or deformation of the adjacent deformable members 102.

The deformable members 102 may have a composition and configuration selected to cause the deformable members 102 to be structurally stable so as to stay oriented toward the intended cushioning direction when not under load from a cushioned object. In other embodiments, the support material 106 may be used to cause the deformable members 102 to stay oriented toward the intended cushioning direction when not under load from a cushioned object. The support material 106 may be used to maintain desirable spacing between the deformable members 102 (including, if desired, to maintain them in close proximity with one another, separated only by a distance equal to a sum of the thickness of the support material 106 surrounding each of the two deformable members 102).

The deformable members 102 may not be physically attached to any connecting material, and may not be attached to the support material 106. In some embodiments, the composition and configuration of the deformable members 102 and/or the support material 106 may be such that the deformable members 102 remain properly spaced and oriented within the pockets 104 when not under load without being attached to any other material. For example, in some embodiments, the pockets 104 may be sized so that the deformable members will be securely trapped within the pockets 104. In such configurations, the deformable members 102 may be caused to stay in the desired location and orientation during compression and removal of compressive loads by the support material 106. The composition and shape of the deformable members 102 and the size of the pockets 104 may be such that the deformable members 102 cannot become permanently, wrongly positioned within the pockets 104.

If the support material 106 of the pockets 104 is not sealed at the top end 112 and bottom end 114 of the deformable members 102, a connecting layer 105 (FIG. 4) that connects at least two of the deformable members 102 may be used to seal the pockets 104. The connecting layer 105 may be adhered to or fused to the deformable members 102. For example, in some embodiments, the deformable members 102 may be heat-fused to a connecting layer 105 on either the top ends 112 of the deformable members 102 or the bottom ends 114 of the deformable members 102 as shown in FIG. 4, and the support material 106 with pockets 104 that match the shapes and locations of the deformable members 102 may be fitted over the opposite ends of the deformable members 102 and glued to the connecting layer 105. Optionally, another connecting layer then may be heat-fused to the opposite ends of the deformable members 102. In such embodiments, a foam layer may optionally be provided over (e.g., glued to) the connecting layer 105 at the top ends 112 and/or the bottom ends 114 of the deformable members 102. Whether a fabric connecting layer 105 or another type of connecting layer 105 is used or not, the support material 106 in the space or spaces between the deformable members 102 may impart stability to the deformable members 102 that will help the deformable members 102 function properly. If the connecting layer 105 is used on the top ends 112 and/or bottom ends 114 of the deformable members 102 and a bond between the connecting layer and the deformable members 102 fails, the deformable members 102 may continue to operate properly due to the support material 106.

The use of the connecting layer 105 (e.g., a gel skin or fabric) is optional. If a connecting layer 105 is used at one end of the deformable members 102, a second connecting layer 105 is not required to be used (but may be used) at the opposite end of the deformable members 102. The use of a single connecting layer 105 may be advantageous for some configurations of deformable members 102. For example, a hollow, cylindrical deformable member 102 of gel that is about five centimeters (5 cm) in diameter, about five centimeters (5 cm) in height, and has a wall thickness of about twenty-five hundredths of a centimeter (0.25 cm), may collapse or deform within pockets 104 within the support material 106 in which the deformable members 102 are disposed under a compressive load while cushioning, and may not return their proper orientation and configuration after release of the compressive load. Bonding or fusing at least one of the top ends 112 and the bottom ends 114 of such deformable members 102 to fabric or another connecting layer 105 may assist in preventing such occurrences.

In some embodiments, the deformable members 102 may be configured to buckle at a threshold compressive load. If the deformable members 102 are designed to buckle, the buckling causes the load vs. deflection (i.e., stress vs. strain) curve to be non-linear. In other words, a plot of the stress as a function of strain will deviate from a straight elastic line, as shown by the non-limiting examples of load vs. deflection curves for buckling deformable members 102 shown in FIGS. 6A through 6D. In comparison with a linearly elastic cushion, such as a traditional spring cushion, pressure is reduced under the buckling and/or buckled deformable members 102, and the load from the cushioning object that is thus not carried by the buckling and/or buckled deformable members 102 is redistributed to surrounding deformable members 102 that have not buckled, which may tend to equalize pressure over the cushioned object.

The pressure acting on the cushioned object may also be reduced because buckling of the deformable members 102 allows the cushion 100 to conform to the shape of the cushioned object, which may result in an increase in the surface area of the cushioned object over which the pressure is applied. Since pressure is load divided by surface area, increasing the surface area over which the load is applied lowers the pressure acting on the cushioned object. In addition, the deformable members 102 may be configured to buckle such that the buckled deformable member 102 does have sharp points at bend areas, which may cause discomfort to the cushioned object.

In some embodiments, the deformable members 102 of the cushion 100 may include deformable members 102 of different shapes, heights, and/or stiffnesses throughout the cushion 100. By selectively altering such features and characteristics of the deformable members 102 throughout the cushion 100, the cushioning and/or buckling characteristics of the cushion 100 may be selectively designed and tailored.

As one non-limiting example, the cushion 100 may comprise a mattress for a bed that is configured to support the entire body of a person thereon. In such an embodiment, hollow deformable members 102 may be placed within the pockets 104 formed from the supporting material 106, as shown in FIG. 3. The top ends 112 of the deformable members 102 may define the top layer of the mattress, but for an optional top layer 108 and any cover or cover assembly provided over the mattress. For example, a quilted mattress cover may be applied over the deformable members 102 (but not bonded to the deformable members). In such a configuration, the top ends 112 of the deformable members 102 are very close to the body of a person supported on the mattress.

As another non-limiting example, the cushion 100 may comprise hollow deformable members placed within the fabric or film containers 107 as shown in FIG. 8. The support material 106 may be closed the top end 128 and the bottom end 126 of the fabric of film container 107 forming closed ends 109. In some embodiments the cushion 100 may then be secured to the top of another cushion, such as a traditional pocketed coil spring mattress, or another cushion, as disclosed herein. In additional embodiments, a cushion cover, such as a quilted cushion cover may be secured to a top of the cushion 100.

As previously discussed, the composition and configuration of the deformable members 102 and the support material 106 may be selected to allow the top ends 112 of the deformable members 102 to move laterally relative to the bottom ends 114 of the deformable members 102 when a shear stress is applied to the cushion 100. Provided the support material 106 is not overly restrictive, such shear stresses may be relieved by the relatively easy lateral movement of the top of the cushion relative to the bottom of the cushion.

Energy is required to cause a deformable member 102 to buckle and to return to an unbuckled configuration. Thus, the absorption of energy by the deformable members 102 while buckling and returning to an unbuckled configuration results in absorption of shocks and attenuation of vibrations by the cushion. It also takes energy to compress or elongate the material of the deformable members 102 (even in the absence of buckling). Thus, the composition of the deformable members 102 may be selected to comprise a material that is relatively efficient in absorbing shocks and attenuating vibrations to help the cushion 100 absorb shocks and attenuate vibrations. For example, elastomeric gels are relatively efficient in absorbing shocks and attenuating vibrations.

Thus, embodiments of cushions 100 of the invention may provide improved equalization and/or redistribution of pressure, shear relief, and/or shock absorption and/or vibration attenuation, when compared to at least some previously known cushions including pocketed coil spring cushions. In addition, when the deformable members 102 are configured to buckle at a threshold-buckling load, the cushions may further provide support and alignment. For example, in a mattress, the deformable members 102 under the most protruding body parts (e.g., hips and shoulders) can buckle, while the deformable members 102 under the least protruding body parts hold firm without buckling (although they may compress due to a load thereon that is below the threshold-buckling load). The torso of the supported body is supported, while the spine and back of the supported body is maintained in alignment (all while eliminating high pressure points on the hips and shoulders, or other protruding areas). If the hips and shoulders were not allowed to sink in, the torso would not be sufficiently supported, and the torso and, hence, the spine would have to bend to contact and be supported by the mattress. Thus, a mattress comprising deformable members 102 disposed in pockets 104 formed in a support material 106, as disclosed herein, may result in a reduction in excessive pressure points on a body supported by the mattress or other cushion, and may improve the alignment of the spine of the body of a person sleeping on the mattress. The result may be less tossing and turning, and less likelihood of back or neck pain.

The deformable member shown in FIG. 1 may be designed to buckle at a threshold-buckling load. The deformable members 102 of FIG. 1 have a uniform cylindrical cross-sectional shape along their lengths (i.e., along the column axis $L_{102}$), and are arranged at uniform spacing in an ordered array of rows and columns. The intended cushioning direction is along the column axis $L_{102}$ of the deformable members 102. Not all deformable members of all embodiments of the invention will have a straight and parallel column axis, as are the axis $L_{102}$ of the deformable members 102 of FIG. 1.

The direction from which a cushioned object will approach and impinge on the cushion 100 may be considered when designing embodiments of cushions of the invention. Some cushions need to provide cushioning in any of several directions (for example, in a number of differing degrees away from a principle cushioning direction, such as ten degrees away, twenty degrees away, and/or thirty degrees away), and the shapes and orientations of the various deformable members 102 may be designed such that the cushion will provide a desirable cushioning effect along all such expected cushioning directions. In many embodiments of cushions, however, it is generally known that the cushioning direction will be at least primarily along a principle cushioning direction.

For example, gravity will drive a person sitting on a flat horizontal seat cushion, laying on a flat horizontal mattress cushion, or standing on a relatively flat horizontal shoe sole cushion, into the cushion in a direction generally orthogonal to the major top cushioning surface of the cushion. If, for example, the deformable members 102 of FIGS. 1 through 4 are to be part of a seat cushion, the column axis $L_{102}$ of the deformable members 102 may be generally orthogonal to the major top cushioning surface of the cushion, especially when it is desirable for the deformable members 102 to buckle at a threshold buckling threshold-buckling load.

The cushion 100 may be designed to cause the deformable members 102 to buckle only under the higher pressure points (usually the most protruding areas) and be supported by the other areas without buckling by selecting particular combinations of the several variables affecting the threshold-buckling load, which include the spacing between the deformable members, the stiffness (i.e., elastic modulus) of the material of the deformable members 102, the diameter of the deformable members 102, the height (i.e., length along the axis $L_{102}$) of the deformable members 102, the thickness of the wall 116 of the deformable members 102, the durometer (i.e., elastomeric hardness) of the material or materials from which the deformable members 102 are made, the expected weight of a body to be supported on, and cushioned by, the cushion 100, the expected surface area of the supported body in contact with the cushion 100, the shape, dimensions, and locations pockets 104 in the support material 106, the stiffness of the support material 106, the durometer of the support material 106, etc. Test data and practical testing and experience will allow various combinations of such variables to be selected so as to provide desirable threshold-buckling loads and other cushioning characteristics of the cushion 100 (e.g., displacement at buckling, etc.). Of course, cost is also an important consideration, and the cushioning characteristics of the cushion 100 may not be optimized from a performance perspective in favor of lowering the cost of the cushion 100 to consumers. For example, elastomeric gels are generally more expensive than polymeric foams, and, thus, it may be desirable to employ less gel to lower the cost of the cushion 100 than would otherwise be desirable if cushioning characteristics were to be optimized. For example, a foam border around a sofa cushion could be employed so that the deformable members 102 need only be used under the coccyx and ischial tuberosity bones of the sitting user.

As shown in FIG. 2, the support material 106 may be configured to form pockets 104 having a size and shape generally corresponding to the deformable members 102. The pockets 104 may be of any geometric shape, and the shape of the pockets 104 may be the same as or different than the shape of the deformable members 102. In some embodiments, the pockets 104 may be generally rectangular and the deformable members 102 may be generally cylindrical. The pockets 104 may be formed by attaching pieces of the support material 106. For example, pieces of the support material 106 may be glued, sewn, or welded together to form the pockets 104. In some embodiments, the support material 106 may have a thickness of about two thousandths of a centimeter (0.002 cm) to about one centimeter (1 cm).

As shown in FIG. 3, the deformable members 102 are disposed within the pockets 104 in the support material 106. Each of the deformable members 102 may be physically isolated from other deformable members 102 via the support material 106.

As shown in FIG. 4, the top layer 108 may comprise a sheet of foam that is glued to the top major surface of the support material 106, and the bottom layer 110 may also comprise a sheet of foam that is glued to the bottom major surface of the support material 106. In some embodiments, the pockets 104 may be sealed shut at least one of above and below the deformable member 102, as previously described, and at least one of the top layer 108 and the bottom layer 110 may be bonded to the sealed support material 106. In additional embodiments, in which the pockets 104 are left open and the deformable members 102 are exposed at the top or bottom of the pocket 104, the bottom layer 110 may comprise a cotton tricot one-way stretch fabric that is heat-fused to the bottom ends 114 of the deformable members 102. Thus, after the deformable members 102 have been inserted into the pockets 104 in the support material 106 and the cotton tricot one-way stretch fabric connecting layer 105 is fused to the bottom ends 114 of the deformable members, the cotton tricot one-way stretch fabric may be glued to another part of the bottom layer 110, such as foam or another type of cushion. An additional fabric of the top layer 108 then may be provided over the top ends 112 of the deformable members 102 (without fusing or otherwise adhering the additional fabric to the top ends 112), and may be glued to the top major surface of the support material 106. Such a configuration in which the top ends 112 and midsections of the deformable members 102 are unconnected to any other element of the cushion 100 may allow the deformable members 102 to freely buckle under a load, while restraining the bottom ends 114 of the deformable members 102 such that the deformable members 102 cannot turn over within the pockets 104 in the support material 106, particularly if the top of the pocket 104 of the support material 106 is sealed shut or if the pocket 104 extends beyond the top of the deformable member 102. The stretchable nature of the fabric of the top layer 108 may ensure that it will not overly and interfere with the ability of the deformable members 102 and the support material 106 to deform.

In additional embodiments, the bottom ends 114 of the deformable members 102 may be heat-fused to a cotton tricot one-way stretch fabric glued to a foam material of the bottom layer 110. The support material 106 then may then be placed over the deformable members 102 such that each deformable member 102 is located in one of the pockets 104, after which another such fabric of the top layer 108 may be heat-fused to the top ends 112 of the deformable members 102. In addition to heat-fusing the deformable members 102 to the fabrics (i.e., making them into a connecting layer 105 that connects two or more deformable members 102), the support material 106 may be glued to the fabrics. If the top layer 108 and the bottom layer 110 include a layer of foam, such layers of foam also may be glued to the support material 106 over, through, or around the fabrics, or may be glued to the fabrics.

Figure 5:
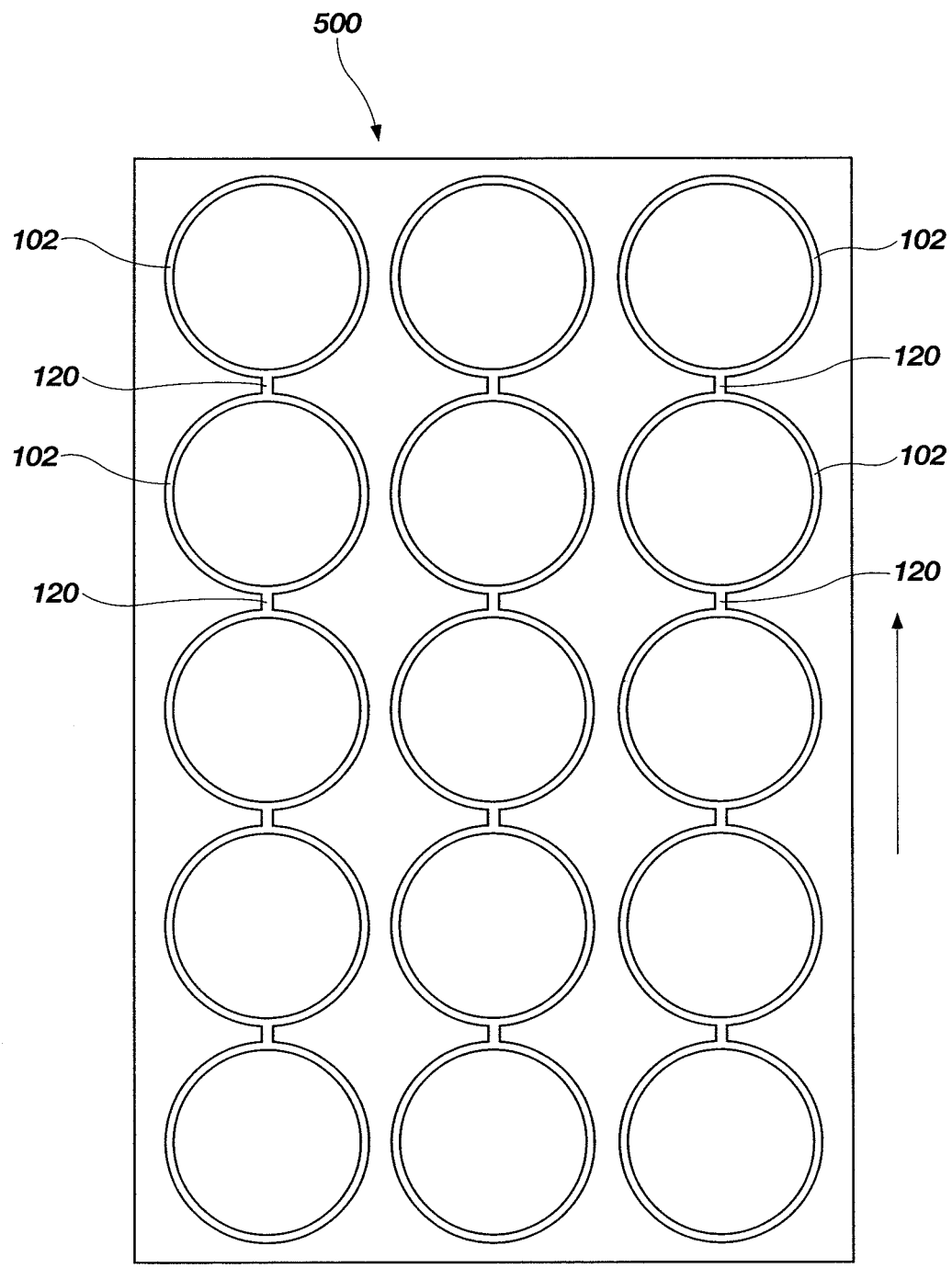
FIG. 5 illustrates fabrication of deformable members like those of FIGS. 1 through 4 using a screed molding process.
Figure 6A:
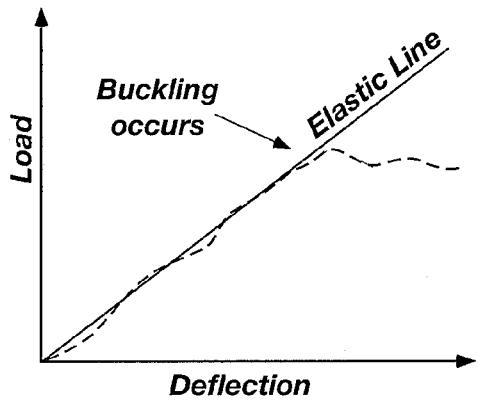
FIGS. 6A through 6D illustrate example, representative load versus deflection curves that may be exhibited by embodiments of deformable members of the present invention when subjected to compressive loading while measuring the load as a function of deflection.
Figure 6B:
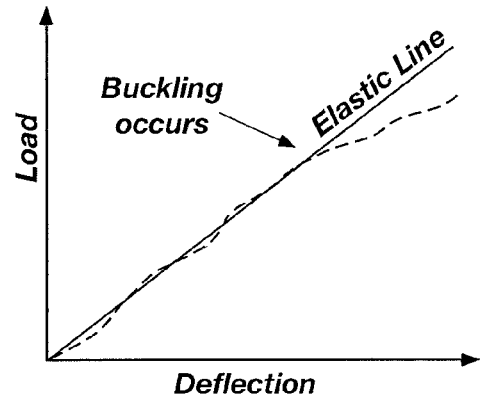
Figure 6C:
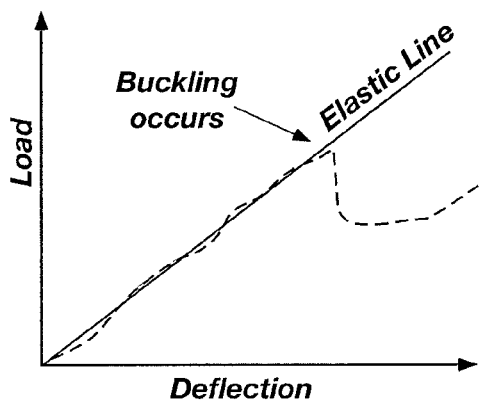
Figure 6D:
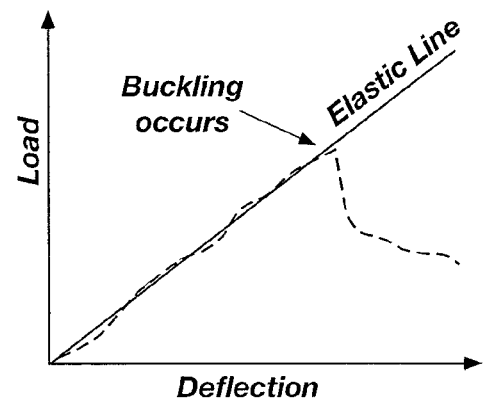

Referring to FIG. 5, which illustrates fabrication of deformable members 102 similar to those of FIGS. 1 through 4 (as discussed in further detail below). For example, a cushion 100 may include a plurality of rows (e.g., lines) of deformable members 102. In some embodiments, joiner ribs 120 may be provided between deformable members 102 in each row, respectively, as shown in FIG. 5. In some embodiments, however, each row of deformable members 102 that are interconnected with one another by joiner ribs 120 may not be connected to an adjacent row of interconnected deformable members 102. Such joiner ribs 120 may be formed between the deformable members 102 as they are manufactured. The joiner ribs 120 may be made of the same material as the deformable members 102, and may be integrally formed therewith.

The joiner ribs 120, when used in conjunction with a screed mold manufacturing process (as discussed in further detail below), may allow multiple deformable members 102 to be pulled out from a mold without the need of having a skin on the top of the mold. The joiner ribs 120 are severed and/or completely removed from the deformable members 102 before placing the deformable members 102 in the pockets 104. In such instances, the advantage of easy removal of the deformable members 102 from a mold may be utilized, and the presence of severed joiner ribs 120 on the deformable members 102 may have little or no affect on the cushioning characteristics of the cushion 100.

As previously mentioned, the deformable members 102 of cushions 100 of the invention may comprise (e.g., may be formed from) a gel. Gel deformable members have a "feel" that is desirable in many types of cushions, such as mattresses, seat cushions, shoe insoles, and the like. Gel is able to buckle with more agility than relatively stiffer elastomers, and sometimes exhibit multiple curves in the load versus deflection plot during buckling. A relatively stiffer elastomer may simply fold and, thus, not exhibit a gradual buckling event, or may not buckle under typical cushioning pressures when manufactured at reasonable wall thicknesses. Gel also provides cushioning without buckling, due to its ability to flow and conform in shape around a cushioned object. Thus, if the cushioned object "bottoms out," the resultant pressure peak on the cushioned object may be less if the cushion comprises gel rather than a relatively harder elastomer. Although gels may be used in some embodiments, non-gel elastomers and/or higher-durometer elastomers, such as cross-linked latex rubber, or cross-linked and non-cross-linked synthetic elastomers of many types (e.g., SANTOPRENE®, KRATON®, SEPTON®, isoprene, butadiene, silicone rubber, thermoset or thermoplastic polyurethane, etc.) may also be used.

There are numerous types of gels that may be used to form deformable members, as described herein, including plasticized silicone gels, plasticized polyurethane gels, plasticized acrylic gels, plasticized block copolymer elastomer gels, and others. Plasticized block copolymer gels may be relatively less tacky and less susceptible to bleed or wicking out of the plasticizer relative to some other types of gels. Plasticized block copolymer gels also may exhibit greater tensile, compression, shear and/or tear strengths relative to some other types of gels, and may not exhibit permanent deformation after being repeatedly stressed or stressed continuously for a long period of type under conditions to which cushions for cushioning at least a portion of a body of a person may be subjected.

Three non-limiting examples of gels that may be used to form deformable members, as described herein, are provided below.

EXAMPLE 1

A gel may be formed by melt blending SEPTON® 4055, which is a relatively high molecular weight Styrene-Ethylene-Ethylene-Propylene-Styrene (SEEPS) tri-block copolymer elastomer, with white paraffinic mineral oil with no or low aromatic content, such as CARNATION® oil. The durometer of the gel can be adjusted as desirable (for example, to tailor the buckling pressure threshold for a given application) by adjusting the ratio of SEEPS to oil. A higher ratio will result in a higher durometer gel. By way of non-limiting example, in some embodiments, the gel may include between 150 and 800 parts by weight of mineral nil to 100 parts by weight SEPTON® 4055. In some embodiments, cushions such as mattresses and seat cushions may include between 250 and 500 parts by weight mineral oil to 100 parts by weight SEPTON® 4055.

The gel can also be stiffened by adding a stiffness reinforcer. For example, a filler material, such as microspheres, may be incorporated into the gel as described in U.S. Pat. No. 5,994,450, which has been incorporated herein by reference.

EXAMPLE 2

A gel may be formed by melt blending KRATON® E1830, which is a Styrene-Ethylene-Butylene-Styrene (SEBS) triblock copolymer elastomer in which the EB mid-blocks of the copolymer molecules have a relatively wide range of relatively high molecular weights, with white paraffinic mineral oil with no or low aromatic content, such as CARNATION® oil. As in Example 1, the durometer of the gel can be adjusted as desirable by adjusting the ratio of SEBS to oil. A higher ratio will result in a higher durometer gel. By way of non-limiting example, in some embodiments, the gel may include between 100 and 700 parts by weight of mineral oil to 100 parts by weight KRATON® E1830. In some embodiments, cushions such as mattresses and seat cushions may include between 150 and 450 parts by weight mineral oil to 100 parts by weight KRATON® E1830.

The gel can also be stiffened by adding a stiffness reinforcer. For example, a filler material, such as microspheres, may be incorporated into the gel as described in U.S. Patent Application Publication No. US 2006/0194925 A1, which published Aug. 31, 2006 and is entitled "Gel with Wide Distribution of MW in Mid-Block," which is incorporated herein in its entirety by this reference.

EXAMPLE 3

A gel may be formed by melt blending a mixture of KRATON® E1830 and SEPTON® 4055, with white paraffinic mineral oil with no or low aromatic content, such as CARNATION® oil. As in Examples 1 and 2, the durometer of the gel can be adjusted as desirable by adjusting the ratio of the polymer mixture to oil. A higher ratio will result in a higher durometer gel. By way of non-limiting example, in some embodiments, the gel may include between 100 and 700 parts by weight of mineral oil to 100 parts by weight of the polymer mixture. Furthermore, the gel may be stiffened as described in relation to Examples 1 and 2.

In any of the examples provided above (or in any other embodiment of the invention), all or part of the plasticizer (e.g., mineral oil) may be replaced with a resin that is solid or liquid at a temperature at which a cushion including the gel is to be used, such as, for example, a hydrogenated pure monomer hydrocarbon resin sold under the product name REGALREZ® by Eastman Chemical Company of Kingsport, Tenn. Use of an ultra-viscous resin may cause the resultant gel to have a relatively slow rebound, which may be desirable for some cushioning applications. Many such resins are commercially available, and REGALREZ® is merely provided as a suitable, non-limiting example. Hollow glass or plastic microspheres may be added to these slow rebound gels to lower the density and/or to increase the durometer.

For example, if 1600 parts of REGALREZ® 1018 is used as the plasticizer with 100 parts of SEPTON® 4055, the resulting gel may be relatively soft and exhibit slow-rebound characteristics at room temperature. REGALREZ® 1018 is a highly viscous fluid at room temperature. Alternatively, in similar embodiments, REGALREZ® 1018 may be replaced with a mixture of mineral oil and any of the REGALREZ® products that are solid (usually sold in chip form) at room temperature. Such a slow-rebound gel that is plasticized using a blend of mineral oil and resin that is solid at room temperature may exhibit less temperature-related changes in durometer and rebound rate over temperatures comfortable to people than will a gel that includes a resin that is liquid at the cushion's use temperature as a sole plasticizer, which has a viscosity that changes with temperature over the range of temperatures comfortable to people (e.g., use of REGALREZ® 1018 at temperatures near room temperature).

Slow-rebound gels that are plasticized with resin may be may be relatively tacky or sticky relative to other gels. In such cases, when the gel deformable members buckle and one part of a deformable member touches another part of the deformable member, they may have a tendency to stick together and not release when the cushioned object is removed. In an effort to reduce or eliminate such occurrences, a surface of the gel deformable members may be coated with a material that will stick to the gel, but that is not itself sticky. For example, a surface of the gel deformable members may be coated with one or more of microspheres and Rayon (velvet) flocking fibers. For example, microspheres may adhere relatively well to the surface of gel deformable members and not easily come off. Thus, the surface of the gel material may be rendered less tacky or un-tacky because the outer surface now comprises the outer surfaces of millions of non-tacky microspheres. As another example, tiny Rayon (velvet) flocking fibers also may adhere relatively well to the surface of the gel deformable members and not easily come off. Thus, the surface of the gel material may be rendered less tacky or un-tacky because the outer surface now comprises the outer surface of thousands of non-tacky short fibers. A third example is to put a thin layer (e.g., skin) of polyurethane elastomer over the gel material, either by application of a thermoplastic polyurethane film, or by coating the gel in an aqueous dispersion of polyurethane and allowing it to dry, or by other methods. The stickiness may be desirable in some embodiments and if so covering may not be done. For example, the outer surface of a deformable member may desirably adhere to the support structure. As a further example, in the non-hollow deformable embodiments described herein, the entire surface of a deformable member may desirably adhere to the support structure and/or to the top and bottom foam lids.

Embodiments of deformable members (e.g., gel deformable) members), as described herein above, may be manufactured using any process that can create deformable members of any desirable configuration and any desirable material composition. The following manufacturing methods are provided as non-limiting examples:

In embodiments in which the deformable members comprise a thermoplastic material (e.g., a thermoplastic gel), they may be manufactured using an injection molding process. A mold is made by means known in the art with cavities that are filled by any standard injection molding process. The material is cooled within the mold cavity, the mold is opened, and the fabricated part is ejected from or pulled out of the mold. A gel material of a molded part may conform to ejector pins used to eject the molded part out from the mold cavity as the pins are thrust into the mold cavity to eject the part, such that the part may not be properly ejected from the mold cavity. Thus, the injection molds may not include such ejector pins, and the mold operator may manually pull out the molded gel products from the mold cavity. One advantage to injection molding gel deformable members is that, when the molded gel deformable members are pulled on by a mold operator, the Poisson's effect may temporarily significantly reduce the cross-sectional thickness of the molded gel deformable members, and, as a result, the molded gel deformable members may pull out from the mold cavity without the need for a draft angle on the cavity surfaces, and may even be removed if the mold cavity includes undercut regions in some cases. In embodiments that comprise a gel which when melted or before curing is sufficiently non-viscous to pour, the gel can be poured into the cavities in the support structure, then allowed to cool (if a thermoplastic) or to cure (if a thermoset).

In additional embodiments of the invention, deformable members, as described herein, may be manufactured using an extrusion process. For example, each gel deformable member of a cushion may be separately extruded using extrusion processes known in the art. For example, molten material may be forced through an aperture in a die using a rotating, stationary screw in a barrel (e.g., an extruder). The die aperture may have the desired cross-sectional shape of the deformable member to be formed. The extruding material may be cut-off or severed at intervals corresponding to the desired lengths of the deformable members, and the extruded deformable members may be cooled. The deformable members then may be arranged in a desired pattern for the fabric pockets or other support material to be placed around the deformable members. The die used in such an extrusion process may be relatively small, as it may correspond in size to only a single deformable member, which may be desirable relative to processes that require tooling having a size comparable to that of the entire cushion being formed. Thus, embodiments of deformable members, as disclosed herein, may be manufactured using tooling and equipment that is relatively smaller, less complicated, and less expensive compared to tooling and equipment used to form previously known gel or buckling gel cushions.

In situations in which the equipment and/or tooling cost is not as important as other considerations, such as having an integral skin or where volume of production is such that the equipment and tooling cost is amortized over a very large number of parts and thus becomes inconsequential), an open-faced pressure-screeding system may be used to manufacture deformable members in accordance with additional embodiments of the present invention. Such methods are disclosed in, for example, U.S. Pat. No. 7,666,341, which issued Feb. 23, 2010 to Pearce, and which is incorporated herein in its entirety by this reference. Such a process is briefly disclosed below.

A screed mold may be formed or otherwise obtained that has a rigid body. The screed mold comprises an open-faced mold, and has multiple recesses in the rigid body that define cavities of the screed mold, such that gel or another material may be forced into the cavities of the mold to form deformable members of a desirable shape. The screed mold optionally may have a raised lip around a periphery of the mold, which allows for a sheet of gel or other material to form at the top of the screed mold over the face, which sheet will be integral with the deformable members formed in the cavities of the mold. In additional embodiments, the screed mold may not include such a raised lip, such that the gel or other material may be screeded flush or nearly flush with the top surface of the open face of the mold by a screed head used to inject the gel or other material into the cavities, or by another tool, with any excess being scraped off after that portion of the mold exits the screed head.

An injection head then may be used to inject gel or other material into the mold cavities. The injection head may have a plurality of distribution channels therein through which molten gel or other material may flow. The distribution channels optionally may be subdivided into sub-distribution channels, and the distribution or sub-distribution channels may terminate at exit ports through which molten gel exits the injection head and enters the screed mold. The injection head also may include at least one external or internal heating element for heating the injection head.

The injection head may be positioned adjacent the screed mold in a location and orientation such that molten gel may flow from the injection head distribution channels out of the exit ports and into the cavities of the screed mold and, optionally, into a skin-forming recess of the mold.

A pumping source may be utilized to pressurize and pump the gel or other material and force it into the injection head, through the distribution channels of the injection head, out of the exit ports of the injection head, and into the screed mold. Relative movement may be provided between the injection head and the screed mold during the injection process, such that the injection head fills the mold cavities and screeds molten gel or other material off from the open face of the mold in a progressive manner.

The gel or other material may be cooled and solidified within the cavities of the mold, after which the molded gel or other material may be removed from the cavities of the screed mold. Thus, deformable member having a desired geometric shape may be formed, and may be formed with or without an integral skin layer.

An integral skin layer may allow the molded structure comprising a plurality of deformable members to be lifted out from the mold in a single piece, since they are all connected by the skin layer. Additionally, if a skin layer is desired as a connecting layer connecting at least one of the tops and the bottoms of the deformable members, the integral skin layer may maintain the deformable members properly positioned relative to one another. However, if no integral skin layer is desired, the screed mold side lips may be omitted and the screed mold may be automatically or manually scraped off at the top of each deformable member during or after the molding process. Then, if a fabric is desired as a connecting layer connecting at least one of the tops or the bottoms of the deformable members, to avoid the necessity of removing each member individually, a fabric may be pressed into the molten gel or other material. If the material has solidified within the mold, end portions of the deformable members may be heated to a temperature sufficient to re-melt the end portions of the deformable members prior to pressing the fabric into the end portions of the deformable members. The deformable members then may be cooled, and the assembly comprising the fabric and the deformable members attached thereto may be pulled out of the mold. Other methods may also be used to aid in removal of deformable members from the mold cavities together, or each deformable member may simply be individually pulled out from the mold.

In additional embodiments of the invention, the deformable members may include joiner ribs, as previously described herein, such that an entire row or line of deformable members may be pulled out from the mold together. FIG. 5 shows a screed mold 500 that is configured to form an array of deformable members 102 that includes three rows or lines of deformable members 102 (shown extending vertically in FIG. 5). The screed mold 500 is also configured to form joiner ribs 120 between the deformable members 102 in each respective row of deformable members 102. Thus, as a single deformable member 102 is removed from the screed mold 500 and continued to be moved away from the screed mold 500, the joiner rib 120 would then pull out the adjacent deformable member 102, and then the next joiner rib 120 would pull out the next deformable member 102, and so on. In some embodiments, a slot for a joiner rib 120 may be provided at the ends of the mold 500 corresponding to the ends of the rows of deformable members 102, such that successive molds 500 can be sequentially passed through the screed system and the joiner rib 120 connected to the last deformable member 102 of one mold 500 would be integral and continuous with the first deformable member 102 of the succeeding mold 500, and would thus pull out the first deformable member 102 of the succeeding mold 500. In such embodiments, the screed molding process may be operated continuously once it is started. Several molds 500 may be used, and each can be returned from the end of the screed molding system to the front end of the screed molding system after the molded deformable members 102 are removed from the mold 500. Several rows or lines of deformable members 102 with joiner ribs 120 may be pulled out simultaneously. For example, in the embodiment of FIG. 5, all three lines of deformable members 102 may be pulled out from the mold simultaneously.

Once removed from the mold, any skin or joiner ribs 120 used to assist in removing the deformable members 102 from the mold are severed and/or removed from the deformable members 102. The removed skin or joiner ribs 120 may be melted and reused in subsequent molding processes.

If desired, a connecting layer may be fused into the tops and/or bottoms of the deformable members, as described above. The connecting layer may include a fabric fused into the ends of deformable members by placing the deformable members in their desired spacing and orientation, then placing the fabric over the top and smoothing out any wrinkles in the fabric. A heated platen then may be brought into contact with the fabric and the underlying ends of the deformable members. The temperature of the heated platen may be such that the gel or other material will melt, but not burn or otherwise degrade. The heated platen may be part of a press device, which may have a mechanical stop at a predetermined distance below the plane at the top of the fabric. For example, the heated platen may be stopped at a predetermined distance below the plane at the top of the fabric upon closing the press that is at least half the thickness of the fabric. After a period of time sufficient to melt the gel or other material, and to allow the gel to flow into the external and/or internal interstices of the fabric, the platen may be raised, and the gel or other material may be allowed to cool and solidify. The assembly then may be removed from the press. This process optionally may be performed on the opposite side of the assembly after putting the support material around the deformable members. Embodiments of cushions of the present invention may include a cover, which may be bonded or unbonded to the interior cushioning member of the cushion. For example, a cover may simply be slipped over the interior cushioning member, and, optionally, may be closed using, for example, a zipper or hook-and-loop material. In embodiments of furniture cushions, the cover may comprise an upholstery fabric, leather, etc. In embodiments of wheelchair cushions, the cover may comprise a stretchable, breathable, waterproof fabric, such as a spandex-type knitted material laminated to a thin polyurethane film.

The cushion shown in FIGS. 1-4 may be configured as a furniture cushion, a wheelchair cushion, a mattress, a mattress overlay, or any other type of cushion.

Embodiments of deformable members, as described herein, may be used in an unlimited number of cushioning applications. Deformable members may be designed to buckle at a predetermined threshold pressure level, and this buckling may relieve pressure hot spots and redistribute pressure so that no part of the cushioned object receives pressure above the predetermined threshold pressure level. In addition, the ability of the individual deformable members to deform laterally relative to the direction of the principal cushioning load may relieve shear stresses on the cushioned object. Further, the nature of most elastomers and especially plasticized elastomers, such as gel, is to absorb shock and attenuate vibration, which, when combined with the shock absorption and vibration attenuation that is provided by buckling action of deformable member, may provide further improved shock absorption and vibration attenuation characteristics in accordance with some embodiments of cushions of the invention. Any cushioning application needing any or all of these characteristics may benefit by utilizing deformable members in pockets, as described herein. It would be impossible to list all such cushioning applications; however, a few applications include consumer and medical mattresses, consumer and medical mattress overlays, pillows for the head, seat cushions, neck cushions, knee pads, shoe insoles, shoe sock liners, shoe midsoles, shoe outsoles, orthopedic braces, wheelchair positioners and cushions, surgical positioners, heel pressure relievers for invalids, crib mattresses, crib pads, diaper changing pads, pet beds, pet pads, bicycle seats, bicycle seat overlays, seat overlays or seats for cars, motorcycles, recreational vehicles (RVs) semi-trucks, heavy equipment and farm tractors, gymnastic pads, yoga pads, aerobic pads, exercise benches, boxing gloves, sports impact padding, helmets, aircraft seats, furniture for the home including sofas, recliners, love seats and chairs, furniture for the office including office chairs, patio furniture, hunting pads, baby carrier straps, infant car seats, backpack straps, backpack scapula pads and backpack and fanny pack waistbands.

Additional non-limiting examples of embodiments are set forth below.

Embodiment 1

A cushion comprising: a support material having a plurality of connected pockets formed therein, the support material comprising at least one of a fabric and a film; and a plurality of deformable members, at least one deformable member of the plurality of deformable members disposed within at least one of the connected pockets of the plurality of connected pockets, the plurality of deformable members comprising a deformable polymer material.

Embodiment 2

The cushion of Embodiment 1, wherein the deformable members of the plurality of deformable members comprise hollow tubes.

Embodiment 3

The cushion of any of Embodiments 1 through 2, wherein the deformable members of the plurality of deformable members are configured to buckle when compressed generally parallel to the column axes of the deformable members of the plurality of deformable members to a pressure beyond a threshold-buckling pressure level.

Embodiment 4

The cushion of any of Embodiments 1 through 3, wherein the deformable member exhibits a non-linear stress-strain curve in compression.

Embodiment 5

The cushion of any of Embodiments 1 through 4, wherein the deformable polymer material comprises gel.

Embodiment 6

The cushion of any of Embodiments 1 through 5, wherein the support material comprises a stretchable material.

Embodiment 7

The cushion of Embodiment 6, wherein the stretchable material comprises at least one of a polyurethane film and polyvinyl chloride film.

Embodiment 8

The cushion of any of Embodiments 1 through 7, wherein each connected pocket of the plurality of connected pockets laterally isolates each deformable member of the plurality of deformable members therein from each of the other deformable members of the plurality of deformable members.

Embodiment 9

The cushion of any of Embodiments 1 through 8, wherein the deformable members of the plurality of deformable members are oriented generally parallel to one another, and a column axis of each deformable member of the plurality of deformable members is oriented generally perpendicular to a cushioning surface of the cushion.

Embodiment 10

The cushion of any of Embodiments 1 through 9, wherein at wherein at least one of top ends and bottom ends of the deformable members of the plurality of deformable members are interconnected by at least one of a fabric and a skin layer.

Embodiment 11

The cushion of any of Embodiments 1 through 9, wherein the support material of at least one of the connected pockets of the plurality of connected pockets is sealed at least around at least one of the top end and the bottom end of the deformable member of the plurality of deformable members disposed within the at least one of the connected pockets.

Embodiment 12

The cushion of any of Embodiments 1 through 9, further comprising another cushion connected to at least one of the support material and the deformable members.

Embodiment 13

The cushion of any of Embodiments 1 through 9, further comprising a cushion cover connected to at least one of the support material and deformable members.

Embodiment 14

A cushion, comprising: a plurality of deformable members, each deformable member of the plurality of deformable members comprising a gel material, each deformable member of the plurality of deformable members configured as a column having a column axis; a support material at least partially surrounding each deformable member of the plurality of deformable members, the support material having a plurality of pockets formed therefrom, each deformable member of the plurality of deformable members disposed respectively within a pocket of the plurality of pockets; and wherein at least one deformable member of the plurality of deformable members is configured to buckle within a pocket of the plurality of pockets when compressed along the column axis of the deformable member to a pressure beyond a threshold pressure level.

Embodiment 15

The cushion of Embodiment 14, wherein each deformable member of the plurality of deformable members is isolated along the length thereof from each of the other deformable members of the plurality of deformable members by the support material.

Embodiment 16

The cushion of any of Embodiments 11 through 13, wherein the deformable members of the plurality of deformable members are oriented generally parallel to one another, and the column axis of the deformable members of the plurality of deformable members are oriented generally perpendicular to a cushioning surface of the cushion.

Embodiment 17

The cushion of any of Embodiments 11 through 16, wherein the support material is sealed at least one of above the deformable members of the plurality of deformable members or below the deformable members of the plurality of deformable members.

Embodiment 18

The cushion of Embodiment 17, wherein the support material is configured to stretch as a deformable member of the plurality of deformable members buckles.

Embodiment 19

A method of forming a cushion, comprising: forming a plurality of deformable members, each of the deformable members of the plurality of deformable members comprising a deformable polymer material and configured as a column having a column axis; forming a plurality of interconnected pockets from a support material comprising at least one of a fabric material and a film; and disposing each of the deformable members of the plurality of deformable members in each interconnected pocket of the plurality of interconnected pockets.

Embodiment 20

The method of Embodiment 19, further comprising at least substantially laterally isolating each deformable member of the plurality of deformable members from other deformable members of the plurality of deformable members by the support material.

Embodiment 21

The method of any of Embodiments 19 and 20, further comprising configuring at least one deformable member of the plurality of deformable members to buckle when compressed along a column axis of the at least one deformable member of the plurality of deformable members to a pressure beyond a threshold-buckling pressure level.

Embodiment 22

The method of Embodiment 21, further comprising selecting the support material to stretch as a deformable member of the plurality of deformable member buckles.

Embodiment 23

The method of any of Embodiments 19 through 22, further comprising selecting the deformable polymer material to comprise gel.

Embodiment 24

The method of any of Embodiments 19 through 23, further comprising selecting the support material to comprise a stretchable material.

Embodiment 25

The method of any of Embodiments 19 through 24, further comprising: orienting the axes of the deformable members of the plurality of deformable members generally parallel to one another; and orienting the column axes of the deformable members of the plurality of deformable members perpendicular to a cushioning surface of the cushion.

Embodiment 26

The method of any of Embodiments 19 through 25, further comprising interconnecting at least one of top ends and bottom ends of the deformable members of the plurality of deformable members using at least one of fabric and a skin layer.

Embodiment 27

The method of any of Embodiments 19 through 26, further comprising sealing at least one of a top portion and a bottom portion of the support material of each interconnected pocket of the plurality of interconnected pockets around each of the deformable members of the plurality of deformable members disposed in each interconnected pocket.

Embodiment 28

The method of embodiment 27, further comprising securing a connecting layer over the sealed at least one of a top portion and a bottom portion of the support material.

Embodiments of the invention may be susceptible to various modifications and alternative forms. Specific embodiments have been shown in the drawings and described in detail herein to provide illustrative examples of embodiments of the invention. However, the invention is not limited to the particular forms disclosed herein. Rather, embodiments of the invention may include all modifications, equivalents, and alternatives falling within the scope of the invention as defined by the following appended claims. Furthermore, elements and features described herein in relation to some embodiments may be implemented in other embodiments of the invention, and may be combined with elements and features described herein in relation to other embodiments to provide yet further embodiments of the invention.

What is claimed is:

1. A mattress cushion comprising:
   a support material having a plurality of connected pockets formed therein, the support material comprising at least one of a fabric and a film; and
   a plurality of laterally isolated deformable members, at least one deformable member of the plurality of laterally isolated deformable members disposed within at least one of the connected pockets of the plurality of connected pockets, the plurality of deformable members comprising a deformable polymer material;
   wherein the support material is configured to maintain the laterally isolated deformable members within the connected pockets when the laterally isolated deformable members are not under load without the laterally isolated deformable members being attached to any other material.

2. The mattress cushion of claim 1, wherein the plurality of laterally isolated deformable members comprises a plurality of hollow tubes.

3. The mattress cushion of claim 1, wherein the deformable members of the plurality of laterally isolated deformable members are configured to buckle when compressed generally parallel to column axes of the deformable members of the plurality of laterally isolated deformable members to a pressure beyond a threshold pressure level.

4. The mattress cushion of claim 1, wherein the at least one deformable member of the plurality of laterally isolated deformable members exhibits a non-linear stress-strain curve in compression.

5. The mattress cushion of claim 1, wherein the deformable polymer material comprises gel.

6. The mattress cushion of claim 1, wherein the support material comprises a stretchable material.

7. The mattress cushion of claim 6, wherein the stretchable material comprises at least one of polyurethane film and polyvinyl chloride film.

8. The mattress cushion of claim 1, wherein the deformable members of the plurality of laterally isolated deformable members are oriented generally parallel to one another, and column axes of the deformable members of the plurality of laterally isolated deformable members are oriented generally perpendicular to a cushioning surface of the cushion.

9. The mattress cushion of claim 1, wherein at least one of top ends and bottom ends of the deformable members of the plurality of laterally isolated deformable members are interconnected by at least one of a fabric and a skin layer.

10. The mattress cushion of claim 1, wherein the support material of at least one of the connected pockets of the plurality of connected pockets is sealed at least around at least one of a top end and a bottom end of the deformable member of the plurality of laterally isolated deformable members disposed within the at least one of the connected pockets.

11. The mattress cushion of claim 1, wherein another cushion is connected to at least one of the support material and the deformable members.

12. The mattress cushion of claim 1, further comprising a cushion cover connected to or at least partially surrounding at least one of the support material and deformable members.

13. A cushion, comprising:
   a plurality of laterally isolated deformable members, each deformable member of the plurality of laterally isolated deformable members comprising a gel material, each deformable member of the plurality of deformable members configured as a column having a column axis; and a support material at least partially surrounding each deformable member of the plurality of laterally isolated deformable members, the support material having a plurality of pockets formed therefrom, each deformable member of the plurality of laterally isolated deformable members disposed respectively within a pocket of the plurality of pockets;

wherein at least one deformable member of the plurality of laterally isolated deformable members is configured to buckle within a pocket of the plurality of pockets when compressed along the column axis of the deformable member to a pressure beyond a threshold pressure level without causing displacement or deformation of the adjacent deformable members; and wherein the support material is configured to maintain the laterally isolated deformable members within the connected pockets when the laterally isolated deformable members are not under load without the laterally isolated deformable members being attached to any other material.

14. The cushion of claim 13, wherein each deformable member of the plurality of laterally isolated deformable members is isolated along the length thereof parallel to its column axis from each of the other deformable members of the plurality of deformable members by the support material.

15. The cushion of claim 13, wherein the deformable members of the plurality of laterally isolated deformable members are oriented generally parallel to one another, and the column axes of the deformable members of the plurality of laterally isolated deformable members are oriented generally perpendicular to a cushioning surface of the cushion.

16. The cushion of claim 13, wherein the support material is sealed at least one of above the deformable members of the plurality of laterally isolated deformable members or below the deformable members of the plurality of laterally isolated deformable members.

17. The cushion of claim 16, wherein the support material is configured to stretch as a deformable member of the plurality of laterally isolated deformable members buckles.

18. A method of forming a mattress cushion, comprising:
forming a plurality of laterally isolated deformable members, each of the deformable members of the plurality of laterally isolated deformable members comprising a deformable polymer material, configured as a column having a column axis;
forming a plurality of connected pockets within a support material comprising at least one of a fabric material and a film;
disposing at least one of the deformable members of the plurality of deformable members in at least one connected pocket of the plurality of connected pockets; and
at least substantially laterally isolating each deformable member of the plurality of deformable members from other deformable members of the plurality of deformable members by the support material, such that the support material is configured to maintain the laterally isolated deformable members within the connected pockets when the laterally isolated deformable members are not under load without the laterally isolated deformable members being attached to any other material.

19. The method of claim 18, further comprising configuring at least one deformable member of the plurality of deformable members to buckle when compressed along a column axis of the deformable members to a pressure beyond a threshold-buckling pressure level.

20. The method of claim 19, further comprising selecting the support material to stretch as a deformable member of the plurality of deformable members buckles.

21. The method of claim 18, further comprising selecting the deformable polymer material to comprise gel.

22. The method of claim 18, further comprising selecting the support material to comprise a stretchable material.

23. The method of claim 18, further comprising:
orienting the column axes of the deformable members of the plurality of laterally isolated deformable members generally parallel to one another; and
orienting the column axes of the deformable members of the plurality of laterally isolated deformable members perpendicular to a cushioning surface of the cushion.

24. The method of claim 18, further comprising interconnecting at least one of top ends and bottom ends of the deformable members of the plurality of laterally isolated deformable members using at least one of fabric and a skin layer.

25. The method of claim 18, further comprising sealing at least one of a top portion and a bottom portion of the support material of each interconnected pocket of the plurality of interconnected pockets around each of the deformable members of the plurality of laterally isolated deformable members in each interconnected pocket.

26. The method of claim 25, further comprising securing a connecting layer over the sealed at least one of a top portion and a bottom portion of the support material.

27. A mattress cushion comprising:
a fabric defining a plurality of connected pockets; and
a plurality of laterally isolated foam members, at least one foam member of the plurality of laterally isolated foam members disposed within at least one of the connected pockets of the plurality of connected pockets;
wherein the fabric is configured to maintain the laterally isolated foam members within the connected pockets when the laterally isolated foam members are not under load without the laterally isolated foam members being directly attached to any other material.

28. The mattress cushion of claim 27, wherein each foam member of the plurality of laterally isolated foam members comprises at least one of a thermoset material and a thermoplastic material.

29. The mattress cushion of claim 27, wherein each foam member of the plurality of laterally isolated foam members comprises polyurethane.

* * * * *